of Burghausen, Germany

United States Patent [19]
Nitzsche et al.

[11] B 3,923,736

[45] Dec. 2, 1975

[54] ROOM TEMPERATURE VULCANIZABLE ORGANOPOLYSILOXANES

[75] Inventors: Siegfried Nitzsche; Paul Hittmair; Ernst Wohlfarth; Eckhart Louis, all of Burghausen, Germany

[73] Assignee: Wacker-Chemie G.m.b.H., Munich, Germany

[22] Filed: Sept. 13, 1973

[21] Appl. No.: 397,027

[44] Published under the Trial Voluntary Protest Program on January 28, 1975 as document no. B 397,027.

Related U.S. Application Data

[63] Continuation of Ser. No. 234,367, March 13, 1972, abandoned.

[30] Foreign Application Priority Data

Mar. 16, 1971  Germany............................ 2112522

[52] U.S. Cl........ 260/46.5 G; 117/124 F; 117/125; 117/132 BS; 117/135.1; 117/138.8 E; 117/138.8 UA; 117/143 A; 117/155 R; 117/161 ZA; 260/18 S; 260/37 SB; 260/46.5 E; 260/825; 260/827

[51] Int. Cl.$^2$................................ C08G 77/04
[58] Field of Search.......... 260/46.5 E, 46.5 G, 825; 117/161 ZA

[56] References Cited
UNITED STATES PATENTS

| | | | |
|---|---|---|---|
| 3,032,528 | 5/1962 | Nitzsche et al. | 260/46.5 G |
| 3,408,325 | 10/1968 | Hittmair et al. | 260/37 SB |
| 3,451,964 | 6/1969 | Creamer | 260/46.5 G |
| 3,644,434 | 2/1972 | Hittmair et al. | 260/46.5 G |
| 3,647,725 | 3/1972 | Nitzsche et al. | 260/46.5 G |

Primary Examiner—Melvyn I. Marquis

[57] ABSTRACT

The invention relates to room temperature vulcanizable organopolysiloxane compositions which contain diorganopolysiloxanes having terminal groups capable of condensation with an amino-substituted organosilicon cross-linking compound containing at least three silicon-bonded amino groups of the formula $=NCH(CH_3)C_2H_5$ per molecule.

20 Claims, No Drawings

ROOM TEMPERATURE VULCANIZABLE ORGANOPOLYSILOXANES

This is a continuation of application Ser. No. 234,367, filed Mar. 13, 1972 and now abandoned.

The present invention relates to organopolysiloxanes and more particularly to room temperature vulcanizable organopolysiloxane compositions which contain diorganopolysiloxanes having terminal groups which are capable of condensation with an aminosubstituted organosilicon cross-linking compound having at least three silicon-bonded amino groups per molecule.

In general, the room temperature vulcanizable organopolysiloxane compositions available today can be categorized as (1) two-component systems, and (2) one-component systems. The two component system is mixed just prior to use and must be used relatively soon after mixing because the vulcanizing and curing mechanism is built into the mixture and does not require the influence or addition of any material. Thus when a hydroxyl terminated diorganopolysiloxane is mixed with an alkyl silicate and a metal salt such as dibutyltin dilaurate, the mass begins to vulcanize and cure at once even in confined spaces or packages. On the other hand, the one component system can be packaged in a single package, which can be opened at the time of use. This system requires the presence of a reaction initiator such as water to start the curing reaction.

The one-component room temperature vulcanizable organopolysiloxane compositions (RTV) which contain diorganopolysiloxanes having terminal groups which are capable of condensation with aminosubstituted organosilicon cross-linking compounds are known in the art as "amino-one-component systems". Such systems are disclosed in German Auslegeschriften 1120690 and 1255924.

These amino-one-component systems have certain advantages over other one-component systems prepared from diorganopolysiloxanes having terminal groups capable of condensation and cross-linking with organosilicon compounds in that upon curing they do not eliminate strongly corrosive substances, they cure completely even in the absence of a condensation catalyst and the resulting elastomers adhere better to substrates.

Amino-substituted silicon compounds previously employed in the amino-one-component systems have been derivatives of aliphatic amines and have yielded materials which will rapidly form a skin on the surface of the material on exposure to atmospheric moisture. The formation of the skin on the surface of an otherwise uncured RTV composition impedes the cure of the material under the skin and makes it difficult to further process the material as is frequently required, thus making their use for many purposes impossible.

Therefore, it is an object of this invention to provide novel silanes. Another object of this invention is to provide a one-component room temperature vulcanizable composition. Another object of this invention is to provide an organopolysiloxane composition which can be stored in the absence of moisture and which will cure to an elastomeric solid when exposed to atmospheric moisture. Another object of this invention is to provide a one-component RTV composition employing an amino-substituted silicon compound as the cross-linking and curing agent. Still another object of this invention is to provide a one-component RTV composition having relatively slow skin-over times. A further object of this invention is to provide a one-component RTV composition which cures at temperatures below +5°C. A still further object of this invention is to provide elastomers having a smooth surface.

The foregoing objects and others which will become apparent in the following description are accomplished in accordance with this invention, generally speaking, by providing a novel room temperature vulcanizable one-component composition comprising (1) an essentially linear diorganopolysiloxane having reactive terminal groups and (2) an amino-substituted organosilicon compound having at least three silicon bonded amino groups of the formula =NCH(CH$_3$) C$_2$H$_5$ per molecule. The composition may be cured in the presence of atmospheric moisture to provide an elastomeric solid.

The linear diorganopolysiloxanes employed herein are not novel and can be any of those diorganopolysiloxanes having terminal groups which are capable of condensation with the amino-substituted organosilicon compounds heretofore employed in RTV compositions. The diorganopolysiloxanes which have heretofore been used in the amino-one-component systems may also be used in this invention. Diorganopolysiloxanes which are generally used in the preparation of such compositions and which are suitable for use in this invention may be further represented by the general formula

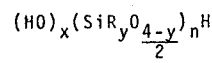

in which R represents a monovalent hydrocarbon radical, a halogenated monovalent hydrocarbon radical or a cyanoalkyl radical, $x$ has an average value of 0.99 to 1.01; $y$ has an average value of 1.99 to 2.01, the sum of $x$ and $y$ is 3 and $n$ is a number having a value of at least 3 and preferably at least 50. The hydroxyl groups on the terminal silicon atoms can be replaced in part or entirely by other reactive groups which are capable of condensation with —SiOH groups, such as groups of the general formula RNH—, where R is the same as above, oxime radicals, alkoxy radicals or alkoxyalkoxy radicals such as CH$_3$OCH$_2$CH$_2$O— or Si-bonded hydrogen atoms. As is indicated, for example, by the average value of 1.99 to 2.01 for $y$, siloxane units having a different degree of substitution can, if desired, be present in small amounts. The operable siloxanes are known and have been described in U.S. Pat. No. 3,294,732, issued Dec. 27, 1966; U.S. Pat. No. 3,127,363, issued Mar. 31, 1964; U.S. Pat. No. 3,105,061, issued September 1963 and others.

The operable siloxane polymers are essentially linear, hence are predominately R$_2$SiO units. However, limited proportions of RSiO$_{3/2}$ units, R$_3$SiO$_{1/2}$ units and/or SiO$_{4/2}$ units can be present.

In the formula above, each R can be a monovalent hydrocarbon radical having up to 24 carbon atoms and more preferably from 1 to 18 carbon atoms. Examples of radicals represented by R include alkyl radicals, such as, methyl, ethyl, isopropyl, n-butyl, sec-butyl and octadecyl radicals; alkenyl radicals, such as, vinyl, allyl, hexenyl and octadecenyl radicals; cycloaliphatic hydrocarbon radicals, such as cyclobutyl, cyclopentyl, cyclohexyl, cyclohexenyl and methylcyclohexyl radicals; aryl radicals, such as, phenyl, xenyl and naphthyl radicals; aralkyl radicals, such as, benzyl, xylyl, beta-phenylethyl and beta-phenylpropyl radicals, and alkaryl radicals, such as tolyl and ethylphenyl radicals.

The substituted hydrocarbon radicals represented by R include halogeno-hydrocarbon radicals, such as, o-, m- and p-, chlorophenyl and bromophenyl radicals, perfluoroalkylethyl radicals, such as, the 3,3,3-trifluoropropyl radicals and cyanoalkyl radicals, and chloro-, fluoro-, and bromo- derivatives of the various hydrocarbon radicals set forth in the preceding paragraph as well as cyano-n-butyl, cyano-n-propyl and omega-cyanooctadecyl.

Preferably at least 50 mol percent of the R radicals bonded to the silicon atoms should be aliphatic hydrocarbon radicals having from 1 4 carbon atoms, and more preferably are methyl radicals. The remaining radicals which may be present are preferably phenyl and/or vinyl radicals. Of course the R radicals on a single silicon atom can be the same or different and various units in the siloxane chain can be similar to differently substituted. The diorganopolysiloxanes can be homopolymers or copolymers, or mixtures of different diorganopolysiloxanes.

The siloxane polymers employed can vary from relatively mobile fluids to gumlike materials. The preferred siloxane polymers are those having viscosities in the range of from about 100 to 500,000 cs. at 25°C.

The cross-linking silicon compounds used in this invention may be prepared, for example by reacting halogensilanes with a secbutylamine. The silane reactant may be defined by the formula $R_aSiX_{4-a}$ where R can be any of the radicals described above and $a$ is 0 or 1. The halogen atoms prepresented by X in the formula above can be fluorine, chlorine, bromine or iodine with chlorine being the most preferred because of its availability.

It is obvious to one skilled in the art that low molecular weight siloxanes containing at least three chlorine atoms per molecule bonded to silicon can be employed. Thus one could employ $X_2RSiOSiR_2X$, $X_2RSiO(XRSiO_2)_2SiRX_2$, and other low molecular weight polychloroorganosiloxanes, if desired.

The reactants can include mixtures of various silanes, hence the reaction is between at least one silane and sec-butylamine.

The reaction of the silane and the sec-butylamine is best carried out in the substantial absence of water and, if desired, in a solvent system. The solvent employed should, of course, be inert to the reactants, and solvents such as toluene and methylene chloride have proven useful. After the reaction has been completed, the reaction product is separated from the amine salts by filtration or other means as desired. The solvent is removed from the reaction product, preferably by distillation under reduced pressure to avoid or minimize decomposition of the reaction product.

The silane and the sec-butylamine are employed in quantities such that there is an excess of the sec-butylamine over the amount required to react with all the halogen atoms present in the silane. It is preferred to employ at least six moles of secbutylamine per mol of silane. The reaction is carried out at the lowest practical temperature to reduce the side reactions. Temperatures in the range of from about 0°C. to about 30°C. have been found to be suitable for this reaction.

In the cross-linking silicon compounds of this invention, the silicon valencies not satisfied by the =NCH(CH$_3$)C$_2$H$_5$ groups are preferably satisfied by monovalent hydrocarbon radicals, halogenated monovalent hydrocarbon radicals, cyanoalkyl alkyl radicals, Si-bonded hydroxyl groups and/or siloxane oxygen atoms.

The cross-linking silicon compounds of this invention are silanes of the general formula $$R_aSi[NHCH(CH_3)C_2H_5)]_{4-a}$$

wherein R is the same as above and $a$ is 0 or 1, preferably 1.

The silane represented by the formula $$CH_3Si[NHCH(CH_3)C_2H_5]_3$$

is preferred, since it is readily available and very active.

Other examples of cross-linking silicon compounds which can be used in accordance with this invention are silazanes of the general formula

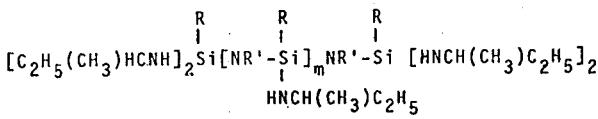

wherein R is the same as above, R' represents hydrogen or a group of the formula —CH(CH$_3$)C$_2$H$_5$ and $m$ is 0 or a number having a value of at least 1 and preferably not more than about 100.

Other cross-linking silicon compounds which can be used in this invention are siloxanes of the general formula $$R_3SiO(SiR_2O)_pSi[NHCH(CH_3)C_2H_5]_3$$

wherein R is the same as above and $p$ is 0 or a number having a value of from 1 to 20.

The cross-linking silicon compounds used in the invention are advantageously employed in amounts of at least 1 mol per gram equivalent of the terminal groups capable of condensation present in the diorganopolysiloxanes. Generally, the amount of organosilicon cross-linking compound will vary from 1 to 10 percent and more preferably from 2.5 to 7 percent by weight, based on the total weight of the composition.

In addition to the diorganopolysiloxanes and the cross-linking silicon compounds described above, the RTV compositions can contain any and all of the additives normally used in these compositions with the provision that water should be excluded as far as is practical. Examples of suitable additives are reinforcing and/or non-reinforcing fillers, pigments, soluble dyestuffs, aromatics (essential oils), organopolysiloxane resins, organic resins, such as polyvinyl chloride powders, corrosion inhibitors, oxidation inhibitors, heat stabilizers, solvents, condensation catalysts, agents for improving the adhesion to substrates of elastomers manufactured from these compositions, polyglycols which can be etherified and/or esterified, and plasticisers, such as trimethylsiloxy endblocked dimethylpolysiloxanes. When some of the R groups on the silicon compounds are alkenyl radicals, such as vinyl, the use of organic peroxides in amounts of from 0.01 to 5 percent by weight based on the weight of the diorganopolysiloxanes is advantageous.

Examples of reinforcing fillers, i.e., fillers having a surface area of more than 50 m$^2$/g, are pyrogenically produced silicon dioxide, silica aerogels and precipitated silicon dioxide of large surface area.

Examples of non-reinforcing fillers, i.e., fillers having a surface area of less than 50 m$^2$/g are quartz powder, diatomaceous earth, calcium silicate, zirconium silicate, so-called "molecular sieves", metal oxide powders such as titania, alumina, ferric oxide, zinc oxide and calcium carbonate. Fibrous fillers, for example, asbestos, glass fibres or organic fibres can also be used.

The fillers can advantageously be treated by known methods to include organosiloxy or allkoxy groups on their surface. Mixtures of different fillers can be used. The fillers are preferably employed in amounts of 5 to 90 percent by weight, based on the total weight of the organopolysiloxane and filler.

Condensation catalysts such as those disclosed in the prior art such as U.S. Pat. Nos. 2,843,555; 3,127,363; and 3,082,527, among others can be employed herein. Examples of condensation catalysts are metal salts and organometallic salts of carboxylic acids, such as lead octoate, dibutyl-tin dilaurate and dibutyl-tin salts of aliphatic carboxylic acids which are branched in the alpha-position to the carboxyl groups and possess 9 to 11 carbon atoms, amines, such as 3-ethoxypropylamine-1, and silanes which contain at least one amino group bonded via carbon to silicon and at least one monovalent hydrocarbon radical, or a hydrocarbon radical substituted by an amino group and/or alkoxy group, and bonded via oxygen to silicon in each molecule. Silanes of the latter which not only act as condensation catalysts but as agents for improving the adhesion to substrates of the elastomers manufactured from the compositions are N-beta-aminoethyl-gamma-aminopropyl-trimethoxysilane and the compound of the formula $$CH_3Si[O(CH_2)_2NH_2]_2(CH_2)_3O(CH_2)_2NH_2$$

If condensation catalysts are used, they are generally employed in amounts of 0.01 to 5 percent by weight, preferably 0.05 to 1 percent by weight, based on the total weight of the compositions.

The compositions of this invention can be stored in any desired package so long as atmospheric moisture is excluded. The material cures upon exposure to atmospheric moisture at room temperature to give elastomers. If desired, the curing of the compositions can also be carried out at temperatures of 5°C. or lower or the cure rate may be accelerated at room temperature or above. The water necessary for curing can be found in atmospheric moisture or water can be added to the surrounding air or by flooding the surface of composition with water. The curing takes place more rapidly when exposed to liquid water.

The RTV compositions will cure and adhere firmly to substrates of the most diverse substances, such as glass, porcelain, earthenware, concrete, mortar, aluminum, wood, paper, polystyrene and synthetic resin lacquer coatings without the use of the customary primers, although it is of course possible to use the compositions on primed substrates. The compositions of this invention are useful as adhesives, especially for adhereing organopolysiloxane elastomers obtained by other means to other materials, for sealing joints and similar cavities in buildings, automobiles, water vehicles and aircraft. They are also useful as protective coatings, textile coatings, as paper coatings to provide a non-stick finish, and in the manufacture of electrical and thermal insulation, as well as for the preparation of laminates.

The amino-one-component systems of this invention have a longer skin formation time, and cure at temperatures below 5°C. with little or no movement of air to provide elastomers having a smooth surface.

The embodiments of this invention are further illustrated by the following examples in which all parts are by weight unless otherwise specified.

EXAMPLE 1

The cross-linking organosilicon compound used in accordance with this invention was prepared as follows:

A reaction mixture was prepared by adding dropwise at room temperature 149.5 parts of methyltrichlorosilane to 460 parts of sec-butylamine in 1,042 parts of dry toluene with agitation. After the chlorosilane addition was completed, the mixture was stirred for an additional 2 hours at room temperature. The sec-butylammonium hydrochloride precipitate was removed by filtration and washed with toluene. The toluene used in washing the precipitate was combined with the filtrate and the resulting solution heated initially at a bath temperature of 140°C. under normal atmospheric pressure and finally at 70°C. at 10 mm Hg (absolute) to remove the volatile products. The residue was filtered and a pale yellowish, slightly mobile liquid product was obtained in a yield of about 87 percent of theory. The product was identified as methyltris-(sec-butylamino)-silane having the formula $$CH_3Si[NHCH(CH_3)C_2H_5]_3$$

EXAMPLE 2 a. About 6.75 parts of methyltris-(sec-butylamine) silane was mixed with 150 parts of a mixture containing 60 parts of a hydroxyl terminated dimethylpolysiloxane having a viscosity of 78,000 cs. at 25°C., 30 parts of a trimethylsiloxy terminated dimethylpolysiloxane having a viscosity of 35 cs. at 25°C., 75 parts of quartz powder and 10 parts of silicon dioxide produced pyrogenically in the gas phase and having a BET surface area of 130 m²/g. The mixing was carried out in the substantial absence of moisture and the mixture so produced stored in a tube. The mixture was pressed from the tube onto a sheet of rigid polyvinyl chloride to give a ribbon of about 5 cm × 2 cm × 2 cm in thickness and placed in a refrigerator at a temperature of about −10°C. After a firm skin was formed on the sample, it was removed and examined for wrinkle formation. The skin is free of wrinkles.

b. A control material was prepared in accordance with the procedure described in (a) except that methyltris-(sec-butylamino) silane was replaced with an equal weight of methyltris-(cyclohexylamino) silane. The behavior of the composition in regard to wrinkle formation was determined in accordance with the procedure described in (a). The control material showed numerous sharply indented wrinkles.

c. A further comparison was prepared exactly as in (a) above, except that methyltris-(sec-butylamino) silane was replaced with an equal weight of methyltris-(iso-propylamino) silane. The control material showed slight to moderate wavy wrinkles.

EXAMPLE 3 a. 150 parts of a mixture containing 60 parts of a hydroxyl terminated dimethylpolysiloxane having a viscosity of 78,000 cs. at 25°C., 30 parts of a trimethylsiloxy terminated dimethylpolysiloxane having a viscosity of 35 cs. at 25°C., 75 parts of quartz powder and 10 parts of pyrogenically produced silcon dioxide and having a BET surface area of 130 m²/g were mixed with 6.75 parts of methyltris-(sec-butylamino) silane in an atmosphere substantially free of moisture and stored in a tube. After 6 days, the contents of the tube were exposed to 50 percent relative humidity at 23°C. The elapsed time for skin to form on the exposed surface is illustrated in Table I.

The behavior of the composition in regard to wrinkle formation was determined in accordance with the procedure described in Example 2 (a), except the refrigerator was maintained at 0°C. The skin was free of wrinkles.

b. The procedure described in 3 (a) was repeated, except that 0.15 part of N-beta-aminoethyl-gamma-aminopropyltrimethoxysilane was added to the mixture. The elapsed time for the skin to form is shown in the Table I below.

The behavior of the composition in regard to wrinkle formation was determined in accordance with the procedure described in Example 2 (a), except the refrigerator was maintained at 0°C. The skin was free of wrinkles.

c. The procedure described in 3 (a) was repeated, except that 0.30 part of N-beta-aminoethyl-gamma-aminopropyltrimethoxysilane was added to the mixture. The elapsed time for the skin to form is shown in Table I.

The behavior of the composition in regard to wrinkle formation was determined in accordance with the procedure described in Example 2 (a), except the refrigerator was maintained at 0°C. The skin was free of wrinkles.

TABLE I

| Example No. | Composition | Parts | Skin formation Time - Hours |
|---|---|---|---|
| (a) | methyltris-(sec-butyl-amino) silane | 6.75 | 2.5 hrs. |
| (b) | methyltris-(sec-butyl-amino) silane<br>N-beta-aminoethyl-gamma aminopropyltrimethoxy-silane | 6.75<br>0.15 | 2.0 hrs. |
| (c) | methyltris-(sec-butyl-amino) silane<br>N-beta-aminoethyl-gamma aminopropyltrimethoxy-silane | 6.75<br>0.30 | 1.5 hrs. | d. A control material was prepared in accordance with the procedure described in Example 3 (a), except that an equal weight of methyltris-(cyclohexylamino) silane was substituted for the methyltris-(sec-butylamino) silane. The behavior of the composition in regard to wrinkle formation was determined in accordance with the procedure described in 3 (a). The control material showed strong wavy wrinkles.

EXAMPLE 4 a. 150 parts of a mixture containing 60 parts of a hydroxyl terminated dimethylpolysiloxane having a viscosity of 78,000 cs. at 25°C., 30 parts of a trimethylsiloxy terminated dimethylpolysiloxane having a viscosity of 35 cs. at 25°C., 75 parts of quartz powder and 10 parts of pyrogenically produced silicon dioxide and having a BET surface area of 130 m²/g were mixed with 6.75 parts of methyltris-(sec-butylamno) silane in an atmosphere substantially free of moisture and stored in a tube. After 5 days, the contents of the tube were exposed to 50 percent relative humidity at 23°C. The elapsed time for skin to form on the exposed surface is shown in Table II.

The behavior of the composition in regard to wrinkle formation was determined in accordance with the procedure described in Example 2 (a), except the refrigerator was maintained at −5°C. The skin was smooth and free of wrinkles.

b. The procedure described in 4 (a) was repeated, except that 0.075 part of 3-ethoxypropylamine-1 was added to the mixture. The elapsed time for skin formation is shown in Table II.

The behavior of the composition in regard to wrinkle formation was determined in accordance with Example 4 (a). Again the skin was smooth and free of wrinkles.

c. The procedure described in 4 (a) was repeated except that 0.15 part of 3-ethoxypropylamine-1 was added to the mixture. The skin formation time is shown in Table II.

The behavior of the composition in regard to wrinkle formation was determined at a refrigeration temperature of −5°C. A smooth wrinkle free skin was observed.

d. The procedure described in Example 4 (a) was repeated except that 0.30 part of 3-ethoxypropylamine-1 was added to the mixture. The skin formation time is shown in Table II.

In accordance with the procedure of Example 4 (a) the behavior of the composition in regard to skin formation was determined at −5°C. A smooth, wrinkle free skin was observed.

TABLE II

| Example No. | Composition | Parts | Skin formation Time - hours |
|---|---|---|---|
| (a) | methyltris-(sec-butyl-amino) silane | 6.75 | 2.5 hrs. |
| (b) | methyltris-(sec-butyl-amino) silane<br>3-ethoxypropylamine-1 | 6.75<br>0.075 | 2.0 hrs. |
| (c) | methyltris-(sec-butyl-amino) silane<br>3-ethoxypropylamine-1 | 6.75<br>0.15 | 1.5 hrs. |
| (d) | methyltris-(sec-butyl-amino) silane<br>3-ethoxypropylamine-1 | 6.75<br>0.30 | 0.9 hrs. |

Although specific examples of the invention have been described herein, it is not intended to limit the invention solely thereto but to include all variations and modifications falling within the spirit and scope of the appended claims.

The invention claimed is:

1. A room temperature vulcanizable composition which is obtained by admixing in the substantial absence of moisture an essentially linear diorganopolysiloxane having terminal groups which are capable of condensing with an amino-substituted silicon compound selected from the class consisting of silanes, silazanes and siloxanes having at least three silicon-bonded amino groups of the formula $=NCH(CH_3)C_2H_5$ per molecule, said amino-substituted silicon compound is present in an amount of at least 1 mol per gram equivalent of the terminal groups capable of condensation present in the diorganopolysiloxane.

2. A method for preparing an elastomeric coated substrate which comprises applying the composition of claim 1 to the substrate and thereafter curing the composition in the presence of moisture.

3. The composition of claim 1 wherein the diorganopolysiloxane has the general formula

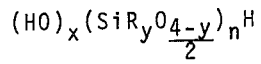

in which R is selected from the class consisting of monovalent hydrocarbon radicals, halogenated monovalent hydrocarbon radicals and cyanoalkyl radicals, $n$ has a value of at least 3, $x$ has an average value of from 0.99 to 1.01, $y$ has an average value of from 1.99 to 2.01 and the sum of $x+y$ is 3.

4. The composition of claim 3 wherein some of the hydroxyl groups have been replaced by other groups which are capable of condensation with SiOH groups.

5. The composition of claim 3 wherein $n$ is a number of at least 50.

6. The composition of claim 3 wherein at least 50 percent of the R radicals are methyl radicals and the remaining R radicals are selected from the class consisting of phenyl and vinyl radicals.

7. The composition of claim 3 wherein the diorganopolysiloxane has a viscosity of from 100 to 500,000 cs. at 25°C.

8. The composition of claim 1 wherein any unsatisfied silicon valences in the cross-linking organosilicon compound are satisfied by groups selected from the class consisting of monovalent hydrocarbon radicals, halogenated monovalent hydrocarbon radicals, cyanoalkyl radicals, Si-bonded hydroxyl groups and siloxane oxygen atoms.

9. The composition of claim 1 wherein the cross-linking organosilicon compound is a silane of the formula $$R_a Si[NHCH(CH_3)C_2H_5]_{4-a}$$

wherein R is selected from the class consisting of monovalent hydrocarbon radicals, halogenated monovalent hydrocarbon radicals and cyanoalkyl radicals and $a$ is a number of from 0 to 1.

10. The composition of claim 9 wherein the cross-linking organosilicon compound is a silane of the formula $$CH_3Si[NHCH(CH_3)C_2H_5]_3$$

11. The composition of claim 1 wherein the cross-linking organosilicon compound is a silazane of the formula $$[C_2H_5(CH_3)HCNH]_2Si\underset{\underset{HNCH(CH_3)C_2H_5}{|}}{\overset{\overset{R}{|}}{[NR'-Si]_m}}\overset{R\cdot}{\underset{|}{NR'}}-\overset{R}{\underset{|}{Si}}[HNCH(CH_3)C_2H_5]_2$$

wherein R is selected from the class consisting of monovalent hydrocarbon radicals, halogenated monovalent hydrocarbon radicals and cyanoalkyl radicals, R' is selected from the class consisting of hydrogen and —CH(CH_3) C_2H_5 and $m$ has a value of from 0 up to about 100.

12. The composition of claim 1 wherein the cross-linking organosilicon compound is a siloxane of the formula $$R_3SiO(SiR_2O)_p[NHCH(CH_3)C_2H_5]_3$$

wherein R is selected from the class consisting of monovalent hydrocarbon radicals, halogenated monovalent hydrocarbon radicals and cyanoalkyl radicals and $p$ has a value of from 0 up to 20.

13. The composition of claim 1 wherein the cross-linking organosilicon compound is used in an amount of from 1 to 10 percent by weight based on the total weight of the composition.

14. The composition of claim 13 wherein the cross-linking organosilicon compound is used in an amount of from 2.5 to 7 percent by weight based on the total weight of the cmposition.

15. The composition of claim 1 wherein the reaction components are mixed at room temperature in the absence of moisture.

16. A method for preparing a vulcanizable composition which comprises admixing in the absence of moisture an essentially linear diorganopolysiloxane having terminal groups which are capable of condensing with an amino-substituted silicon compound selected from the class consisting of silanes, silazanes and siloxanes having at least three silicon-bonded amino groups of the formula $=NCH(CH_3)C_2H_5$ per molecule, said amino-substituted silicon compound is present in an amount of at least 1 mol per gram equivalent of the terminal groups capable of condensation present in the diorganopolysiloxane.

17. The method of claim 16 wherein the diorganopolysiloxane has the general formula $$(HO)_x(SiR_yO)_{\frac{4-y}{2}})_n H$$

wherein R is selected from the group consisting of monovalent hydrocarbon radicals, halogenated monovalent hydrocarbon radicals and cyanoalkyl radicals, $n$ has a value of at least 3, $x$ has an average value of from 0.99 to 1.01, y has an average value of from 1.99 to 2.01 and the sum of $x + y$ is 3.

18. The method of claim 16 wherein the diorganopolysiloxane has a viscosity of from 100 to 500,000 cs. at 25°C.

19. The method of claim 16 wherein the terminal groups of the diorganopolysiloxane are selected from the class consisting of hydroxyl radicals, oximo radicals, alkoxy radicals, radicals of the formula RNH-and hydrogen atoms, in which R is selected from the class consisting of monovalent hydrocarbon radicals, halogenated monovalent hydrocarbon radicals and cyanoalkyl radicals.

20. The method of claim 16 wherein the amino-substituted silicon compound is selected from the class consisting of silanes of the formula $$R_aSi[NHCH(CH_3)C_2H_5)]_{4-a},$$

silazanes of the formula $$[C_2H_5(CH_3)HCNH]_2Si\underset{\underset{HNCH(CH_3)C_2H_5}{|}}{\overset{\overset{R}{|}}{[NR'-Si]_m}}\overset{R}{\underset{|}{NR'}}-\overset{R}{\underset{|}{Si}}[HNCH(CH_3)C_2H_5]_2,$$

and siloxanes of the formula $$R_3SiO(SiR_2O)_pSi[NHCH(CH_3)C_2H_5]_3,$$ wherein R is selected from the class consisting of monovalent hydrocarbon radicals, halogenated monovalent hydrocarbon radicals and cyanoalkyl radicals, R' is selected from the group consisting of hydrogen and a group of the formula—$CH(CH_3)C_2H_5$, $a$ is a number of from 0 to 1, $m$ has a value of from 0 up to about 100 and $p$ has a value of from 0 up to 20.

* * * * *